UNITED STATES PATENT OFFICE.

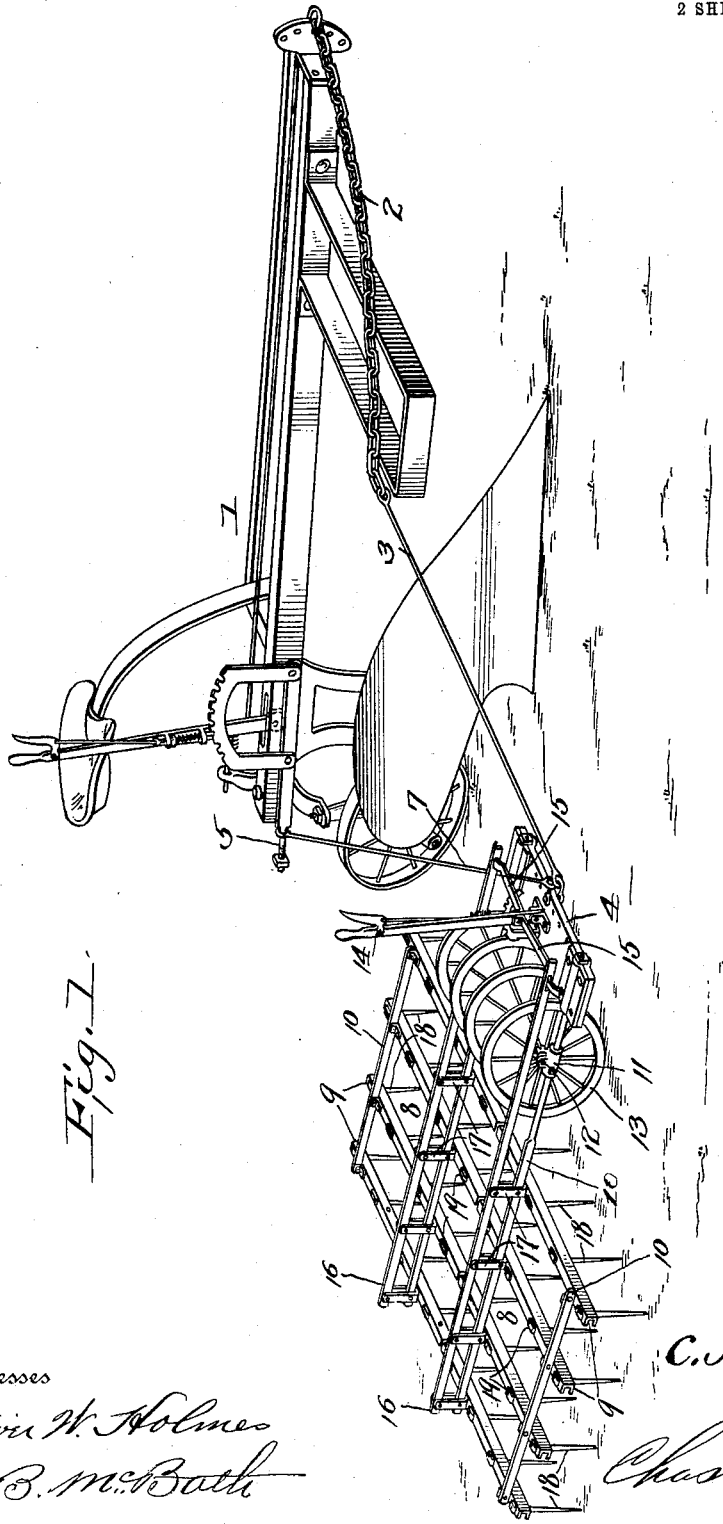

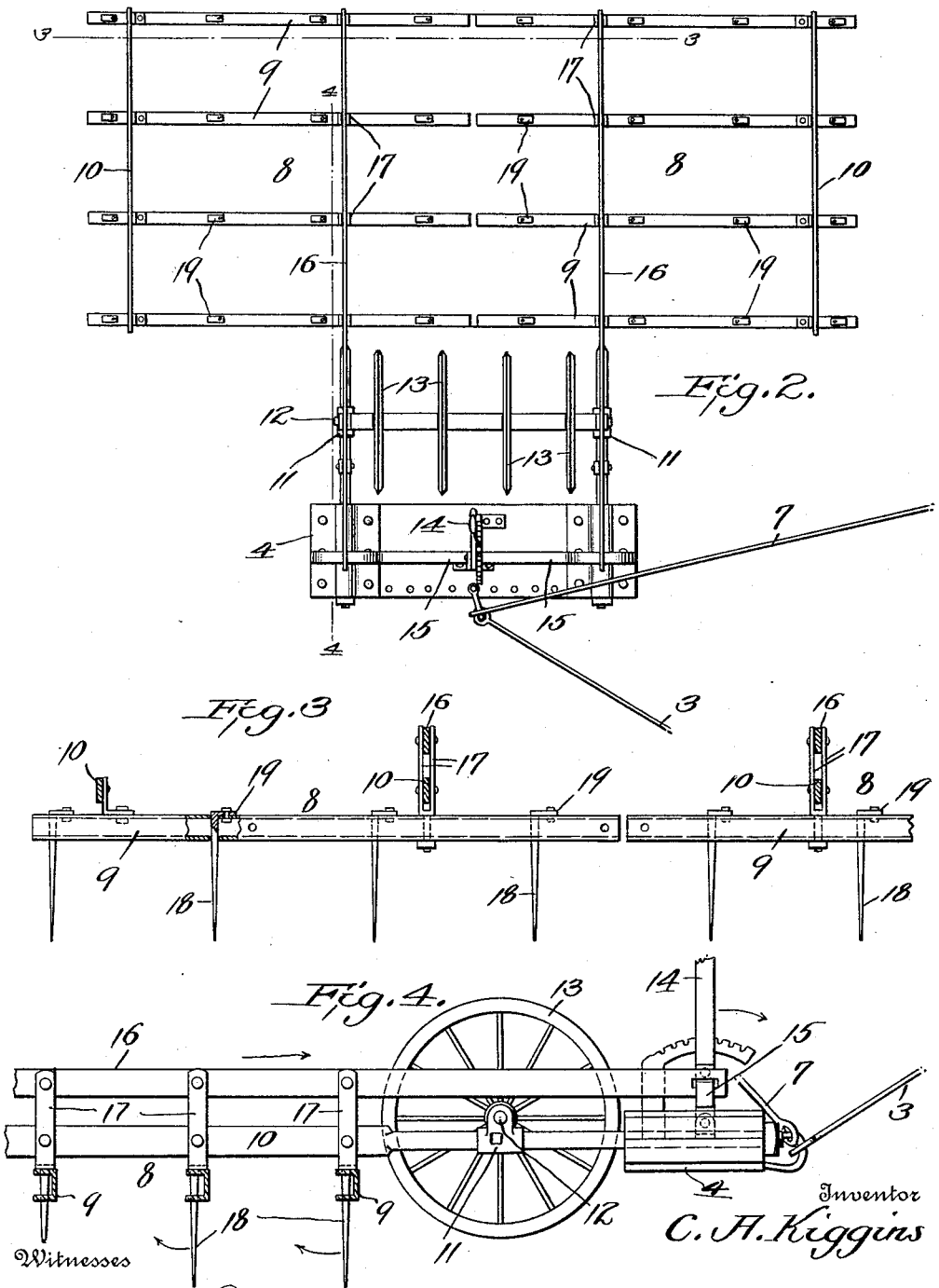

CHARLES ALBERT KIGGINS, OF SHARON SPRINGS, KANSAS.

HARROW AND PULVERIZER ATTACHMENT.

1,113,219.   Specification of Letters Patent.   Patented Oct. 13, 1914.

Application filed June 13, 1912. Serial No. 703,464.

*To all whom it may concern:*

Be it known that I, CHARLES A. KIGGINS, a citizen of the United States, residing at Sharon Springs, in the county of Wallace and State of Kansas, have invented a new and useful Improvement in Harrow and Pulverizer Attachments, of which the following is a specification.

This invention relates to a combined pulverizer and harrow attachment adapted to be connected to sulky plows, also adapted for use in gangs.

The invention consists of the novel features of construction hereinafter described, pointed out in the claims and shown in the drawings, in which, Figure 1 is a perspective view showing the device connected to a sulky plow. Fig. 2 is a plan view of the harrow and pulverizer. Fig. 3 is a section upon the line 3—3 of Fig. 2, said section being enlarged and stopping short of one side of the device. Fig. 4 is a section on the line 4—4 of Fig. 2.

In these drawings, 1 represents a sulky plow, which may be of any desired make or type, and to the forward clevis of said plow is secured a chain 2, which is connected to a rod 3, which in turn is pivotally connected to a draft plate 4 of my harrow and pulverizer. A bolt 5 has an end portion flattened and secured to the rear of the plow beam and upon the unflattened portion of said bolt is slipped an eye of a rod 7, the opposite end of which is also pivotally connected to the draft plate 4. The harrow consists of two frames 8, each of which comprises a plurality of U-shaped bars 9, the bars of one frame being in longitudinal alinement with the bars of the other. These bars are connected by transversely extending bars 10, one of which is placed adjacent the outer end of the frame, and the other of which is arranged between the central portion and the inner end of the frame, and these inner bars 10 of each frame project in advance of the harrow and carry suitable shaft bearings 11. In these bearings I journal a shaft 12, upon which are mounted a number of pulverizing or crushing wheels 13. These wheels, which are shown as being four in number although any number may be employed, are provided with rims, V-shaped in cross section. The forward projecting ends of the inner bars 10 also support the draft plate 4 being rotatable with respect to said plate. Mounted upon said plate and working over the usual ratchet and having the usual hand catch is a lever 14, the lower portion of which carries bars 15, the outer end portions of which are slightly curved. These curved end portions work through suitable slots formed in bars 16. The bars 16 are parallel to and above the inners bars 10 and are secured thereto by a plurality of pivoted links 17. As shown in Fig. 3 these links are preferably formed of U-shaped strips which embrace the bars 10 and 16, said strips being secured to the bars 9 by means of suitable bolts and nuts, the bolts passing through the bars 9, and the nuts bearing upon the undersides of said bars. Secured also to the bars 9 are suitable teeth 18, and these teeth are wedge-shaped and are provided with angled heads 19. The teeth pass downwardly through suitable openings in the U-shaped bars, the angled head 19 resting upon the upper side or top of the bar and being bolted thereto. The lower or bottom side of the bar acts as a brace for the teeth thereby preventing the heads from being twisted or broken off.

It will be obvious from Fig. 4 that by throwing the lever 14 in the direction of the arrow, the bars 16 will be moved forwardly and the teeth 18 will be swung rearwardly as also indicated by the arrows in said figure, so that the inclination of the harrow teeth can be adjusted by means of the lever 14.

What I claim is:—

1. A device of the kind described comprising two frames arranged side by side, each frame consisting of a plurality of bars arranged transversely with respect to the line of travel, teeth carried by said bars, connecting bars arranged transversely with respect to the first mentioned bars, the inner bar of each frame projecting in advance thereof, a shaft supported from said projecting bars and crushing wheels having rims V-shaped in cross section, said wheels being arranged upon said shaft and traveling in advance of said frames.

2. A device of the kind described comprising two frames, arranged side by side, each frame comprising toothed bars, connecting bars, two of said connecting bars extending in advance of the frames, a draft plate supported by said forwardly extending bars, an operating lever upon the draft plate, bars arranged parallel to and above the forwardly extending bars, links pivotally connecting the bars carrying the draft plate, and the last mentioned bars the lever mounted upon the draft plate being operatively connected to said last mentioned bars.

3. A harrow comprising two frames adapted to be placed side by side, a member of each frame projecting in advance thereof, a draft plate supported by said projecting members, bars arranged transversely with respect to said frames, and extending forwardly to said draft plate, links pivotally connecting said bars with the harrow frames and a lever mounted upon the draft plate and operatively connected to said bars.

CHARLES ALBERT KIGGINS.

Witnesses:
C. A. SCHELLHAMER,
JOHN SCHUTT.

Copies of this patent may be obtained for five cents each, by addressing the "Commissioner of Patents, Washington, D. C."